(12) United States Patent
Larsen et al.

(10) Patent No.: US 6,467,987 B1
(45) Date of Patent: Oct. 22, 2002

(54) RESETTABLE NON-EXPLOSIVE ACTUATOR

(75) Inventors: Richard K. Larsen, Lahabra; Christopher M. Gibson, Fountain Valley; Michael J. McGill, Tustin Ranch, all of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/536,248

(22) Filed: Mar. 27, 2000

Related U.S. Application Data
(60) Provisional application No. 60/126,765, filed on Mar. 29, 1999.

(51) Int. Cl.$^7$ .................. F16B 21/00; B23B 31/103
(52) U.S. Cl. .............. 403/321; 403/322.1; 403/326; 279/82.32; 279/906; 335/179
(58) Field of Search .................. 403/325, 321, 403/322.4, 408.1, DIG. 1; 335/179, 178, 177; 279/82.32, 19.4, 906

(56) References Cited

U.S. PATENT DOCUMENTS

| | | | | |
|---|---|---|---|---|
| 2,448,817 A | * | 9/1948 | McArthur | 403/321 |
| 2,726,060 A | * | 12/1955 | Elsner | 403/322.4 X |
| 2,942,903 A | * | 6/1960 | Giladett | 403/321 X |
| 2,951,274 A | * | 9/1960 | Elsner | 24/635 |
| 3,043,614 A | * | 7/1962 | Eichmann | 403/321 |
| 3,622,170 A | * | 11/1971 | Sedgwick | 279/89 |
| 4,237,439 A | * | 12/1980 | Nemoto | 335/179 X |
| 4,671,718 A | * | 6/1987 | Eakin | 403/408.1 X |
| 4,850,734 A | * | 7/1989 | Naumec et al. | 403/322.1 |
| 4,998,842 A | * | 3/1991 | Sheridan | 403/252 |
| 5,466,101 A | * | 11/1995 | Meyen | 279/19.4 X |
| 6,124,771 A | * | 9/2000 | Kim et al. | 335/179 X |
| 6,135,461 A | * | 10/2000 | Below et al. | 279/906 X |

OTHER PUBLICATIONS

M.H. Lucy et al., Report on Alternative Devices to Pyrotechnics on Spacecraft, , NASA Langley Research Center, Jan. 1996 (Presented at Annual AiAA/USU Conference on Small Satellites on Sep. 17–19, 1996).

* cited by examiner

Primary Examiner—Lynne H. Browne
Assistant Examiner—Ernesto Garcia
(74) Attorney, Agent, or Firm—William J. Zak, Jr., Esq.

(57) ABSTRACT

A non-explosive actuator includes a housing, a push rod extending into one end of the housing and a plurality of dogs within the housing. A plunger is inserted into an opposite end of the housing and the push rod is depressed and locked in place. Depressing the push rod causes the dogs to engage the plunger and prevent it from being withdrawn from the housing. Unlocking the push rod eventually causes the dogs to release the plunger and allow the plunger to be withdrawn from the housing. The actuator may be reused after the plunger is removed from the housing. The actuator may be reused simply by re-inserting the plunger into the housing and re-depressing the push rod.

23 Claims, 3 Drawing Sheets

RESETTABLE NON-EXPLOSIVE ACTUATOR

This application claims the benefit of provisional application 60/126,765 filed on Mar. 29, 1999.

BACKGROUND OF THE INVENTION

The present invention relates generally to pyrotechnic and non-explosive actuators. Specifically, the present invention relates to a non-explosive actuator.

Pyrotechnic actuators accomplish many functions on modern spacecraft and launch vehicles: release, cutting, pressurization, valving, ignition, switching and other mechanical work. Commercial applications for pyrotechnic actuators are also expanding. For instance, pyrotechnic actuators are being used by the automotive and aerospace industries.

Typical pyrotechnic actuators include self-contained energy sources such as an explosives or propellants. However, the pyrotechnic actuators usually produce contaminants and high levels of functional shock (explosive and mechanical). Moreover, the pyrotechnic actuators can be used only once. Consequently, end-to-end Built-In Test is difficult to perform and hardware reliability (which usually depends upon repeated testing) is difficult to establish.

Non-explosively actuated ("NEA") devices are being proposed as alternatives to the pyrotechnic actuators. Some NEA devices produce low levels of functional shock. Some NEA devices are capable of instantaneous operation.

Certain NEA devices are reusable. However, reusing these NEA devices typically requires disassembly.

SUMMARY OF THE INVENTION

A non-explosive actuator according to the present invention can be reused without disassembly. The actuator comprises a housing, an actuation cup within the housing, and at least one dog within the housing. The actuation cup is movable between a first position and a second position within the housing. The dog is biased inwards with respect to the housing when the actuation cup is in the first position, and the dog is free to move outwards with respect to the housing when the actuation cup is moved towards the second position.

DETAILED DESCRIPTION OF THE INVENTION

Figures 1, 2:
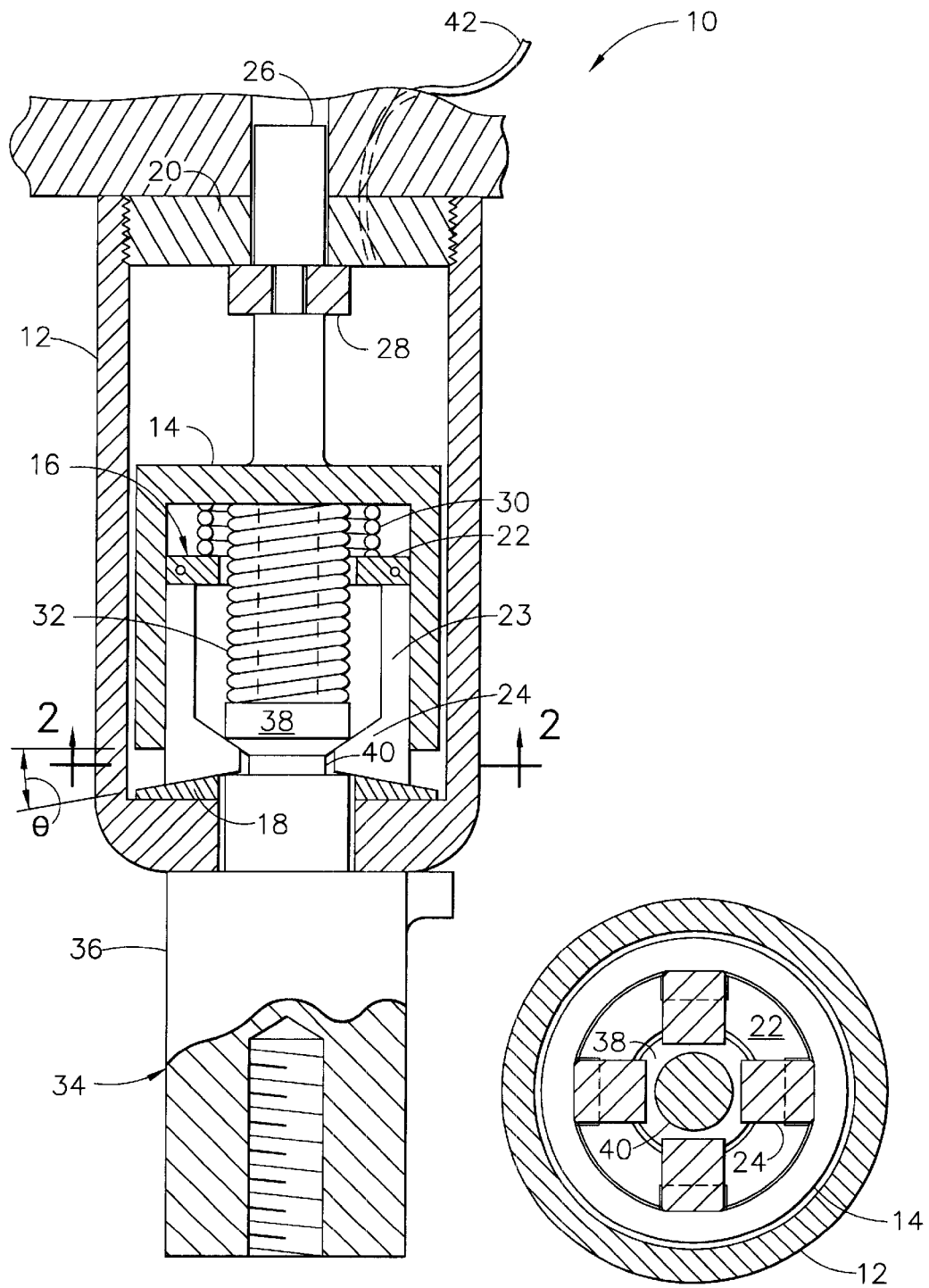
FIG. 1 is an illustration of a first non-explosive actuator according to the present invention.
FIG. 2 is a cross-sectional view of the first non-explosive actuator, the cross-section view being taken along lines 2—2 in FIG. 1.

FIGS. 1 and 2 show a non-explosive actuator 10 including a housing 12, an actuation cup 14 and a dog assembly 16. A taper ring 18 is located at a bottom end of the housing 12. Apertures extend through the taper ring 18 and the bottom end of the housing 12. A top end of the housing 12 has internal threads that engage external threads of an end cap 20.

The dog assembly 16 includes a back plate 22, a plurality of (e.g., four) of dog arms 23 extending from the back plate 22, and a plurality of dogs 24, each dog 24 extending from a dog arm 23. The back plate 22, dog arms 23 and dogs 24 may be brazed together, cast as a single piece or otherwise formed into a unitary structure.

The actuation cup 14 can slide within the housing 12. At a bottom position (as shown in FIG. 1), the actuation cup 14 covers the dog assembly 16. When the actuation cup 14 covers the dog assembly 16, the dogs 24 are forced inward with respect to the housing 12. Thus, at the bottom position, the actuation cup 14 biases the dogs 24 inwards. When moved to a top position (that is, a position at or near the top of the housing 12), the actuation cup 14 does not cover the dogs 24. As a result, the dogs 24 are allowed to move outwards with respect to the housing 12.

A push rod 26 extends into the housing 12 through an aperture in the end cap 20. An end of the push rod 26 may be secured to the back plate 22 of the dog assembly 16. The push rod 26 can move linearly.

A key 28 having the shape of a flat, split lock washer is secured to the end cap 20. The push rod 26 also extends through the key 28. When the key 28 is unloaded, the inner diameter of the key 28 larger than the outer diameter of the push rod 26. However, when the key 28 is loaded (that is, compressed inward), the inner diameter of the loaded key 28 becomes smaller than the outer diameter of the push rod 26. The key 28 is loaded prior to being secured to the end cap 20.

A split in the key 28 allows the key 28 to expand radially outward when the push rod 26 is moved linearly (i.e., up and down). However, when an annular groove in the push rod 26 crosses the key 28, the key 28 engages the annular groove and thereby locks the push rod 26 in place. The push rod 26 is locked in place when the actuation cup 14 is at the bottom position. Thus, the dogs 24 are biased inwards when the push rod 26 is locked in place.

The key 28 may be made of a metal memory material (e.g., nickel-titanium) that exhibits a "Shape Memory Effect" (SME). An SME material undergoes a transformation, which is reversible upon heating. When heated, the metal memory key 28 expands back to its original shape and thereby disengages the annular groove in the push rod 26. Once the key 28 has been disengaged from the push rod groove, the push rod 26 is once again free to move linearly.

A first spring 30 is located between the actuation cup 14 and the back plate 22 of the dog assembly 16. A second spring 32, which extends through an aperture in the back plate 22 of the dog assembly 16, is located between the actuation cup 14 and the taper ring 18 (the outer diameter of the second spring 32 is larger than the inner diameter of the taper ring 18). The first spring 30 biases the back plate 22 while the actuation cup 14 is at the top position. Consequently, the dogs 24 are biased against the taper ring 18 while the actuation cup 14 is at the top position.

A plunger 34 includes a shank 36 having a free end 38 and a tapered groove 40 located near the free end 38. The housing 12, actuation cup 14, push rod 26, and plunger 34 may have a circular cross-section (see FIG. 2). The back plate 22, dogs 24, taper ring 18, housing 12, actuation cup 14, push rod 26 and plunger 34 may all be made of machined steel.

The plunger 34 is locked to the actuator 10 as follows. The free end 38 of the plunger 34 is inserted through the housing aperture and into the housing 12 until it is pressed against the second spring 32. The push rod 26 is then depressed until the key 28 engages the push rod groove. Depressing the push rod 26 forces the actuation cup 14 to move from the top position (i.e., a position in which the from the top of the housing 12) towards the bottom position. The push rod 26 is locked in place when the actuation cup 14 reaches the bottom position. At the bottom position, the actuation cup 14 covers the dog assembly 16 and, consequently, forces the dogs 24 inwards to engage the tapered groove 40 of the plunger 34 (see FIG. 2). Forcing the actuation cup 14 towards the bottom position also causes the first and second springs 30 and 32 to become compressed.

If the plunger 34 is axially preloaded (for example, by attempting to pull the plunger 34 out of the housing 12), the dogs 24 will react the preload and prevent separation of the plunger 34 and housing 12. Little to none of this axial load will be reacted by the key 28.

To release the plunger 34, an excitation is applied to the memory metal key 28 (via a conductor 42 and the end cap 20). The excitation causes the memory metal key 28 to expand out of the push rod groove. With the key 28 disengaged from the push rod 26, the second spring 32 forces the actuation cup 14 towards the top position and away from the dogs 24. The force provided by the second spring 32 is sufficient to overcome friction between the dog arms 23 and an inner wall of the actuation cup 14, as well as friction between the housing 12 and an outer wall of the actuation cup 14. As the actuation cup 14 is moved towards the top position, the dogs 24 move outwards and disengage the tapered groove 40 of the plunger 34. The first spring 30 biases the dog assembly 16 against the taper ring 18, even after the actuation cup 14 has moved to the top position. Biasing the dog assembly 16 against taper ring 18 causes the dogs 24 to move outwards along the taper ring 18 and thereby provide clearance for the plunger 34. The plunger 34 is now free to separate from the housing 12. The second spring 32 may help to eject the plunger 34. However, the primary separation force will be provided by the preload on the plunger 34.

The taper ring 18 has an angled surface that helps to move the dogs 24 outwards. Angling the surface of the taper ring 18 allows the dogs 24 to move outward more easily and thereby reduces the amount of preload needed by the first spring 30. An ideal angle 0 for the angled surface of the taper ring 18 is between 10 and 15 degrees. Thus, biasing the dog assembly 16 against the taper ring 18 will cause the dogs to move "down the ramp".

To reset the actuator 10, the plunger 34 is re-inserted into the housing 12. The dogs 24 do not interfere with the plunger 34 since the dogs 24 are positioned at the bottom of the taper ring ramp and held in place by the first spring 30. The push rod 26 is then depressed until the memory metal key 28 becomes engaged with the push rod groove. Depressing the push rod 26 pushes the actuation cup 14 over the dog assembly 16 (whereby the dogs 24 are forced up the taper ring ramp and engage the tapered groove 40) and compresses the two springs 30 and 32. The actuator 10 is once again ready for operation.

The actuator 10 may be used to couple upper and lower stages of a rocket. While engaged with the plunger 34, the dogs 24 prevent the plunger 34 from being pulled out of the housing 12. Thus, the stages are locked together. At the beginning of stage separation, an excitation is applied to the key 28, whereby the dogs 24 are disengaged from the plunger 34 and the plunger 34 is free to separate from the housing 12. A subsequent difference in acceleration between the two stages (for example, caused by a second stage burn) causes the plunger 34 to be pulled out of the housing 12. Thus, the two stages are allowed to separate. The same operation may be used to release a shroud from a rocket stage.

Figure 3:
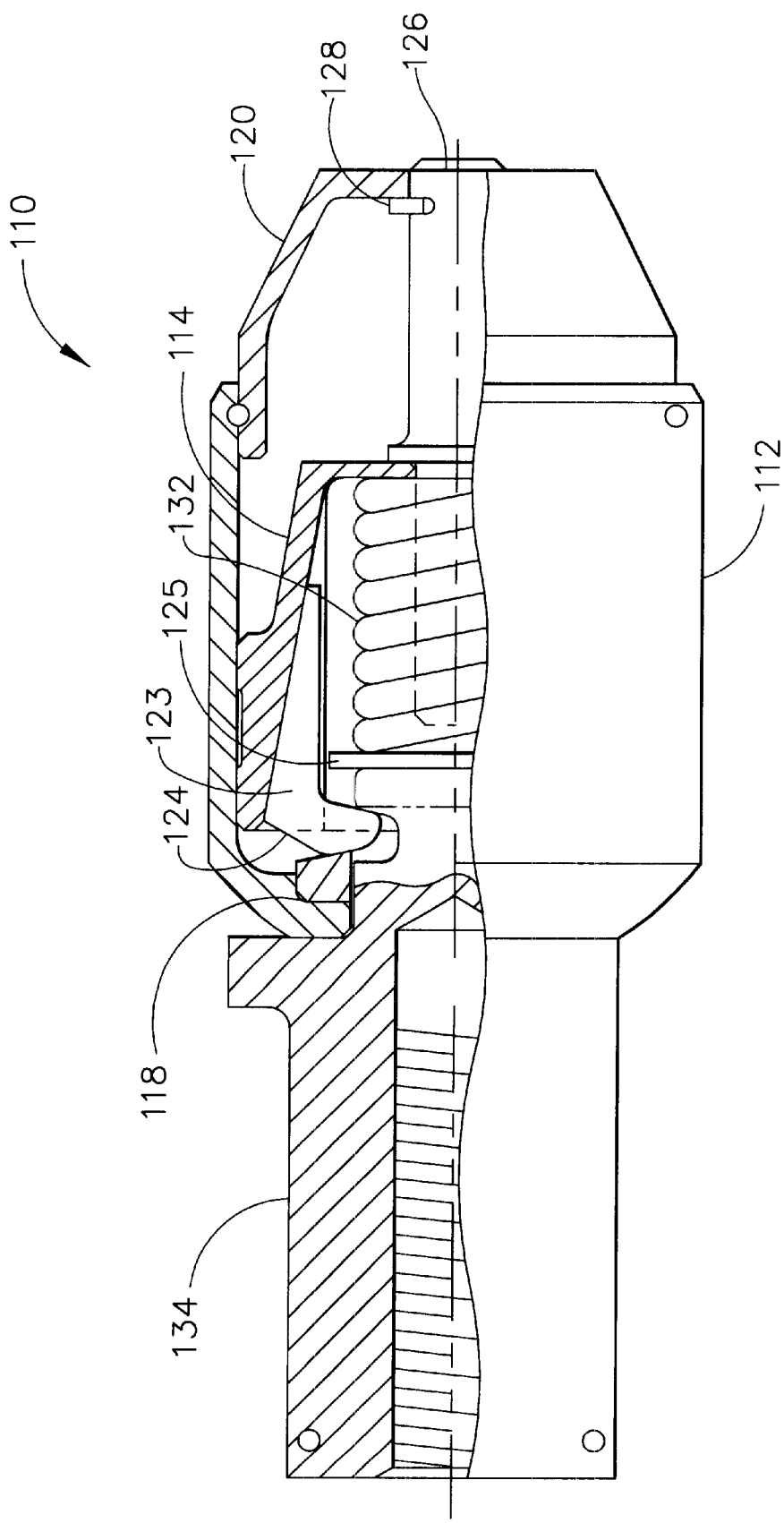
FIG. 3 is an illustration of a second non-explosive actuator according to the present invention.
Figure 4:
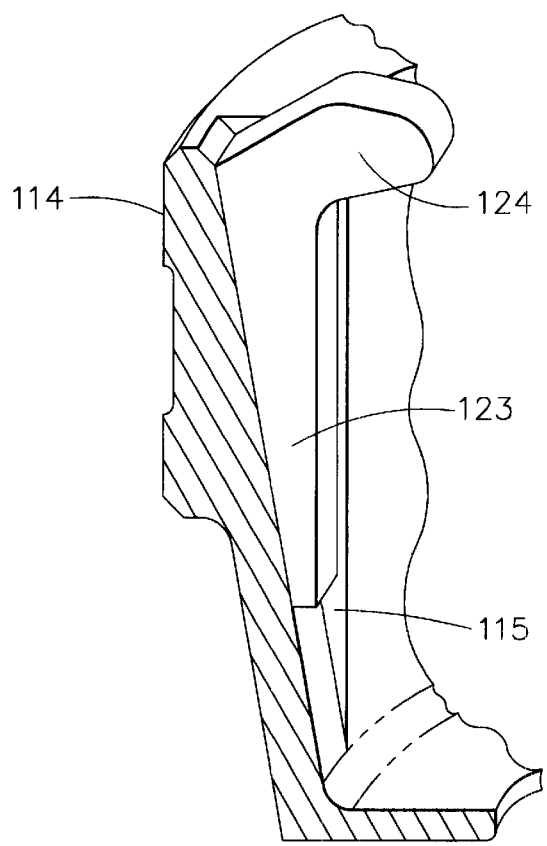
FIG. 4 is an illustration of a grooved actuation cup, which forms a part of the second actuator.

FIG. 3 shows a second non-explosive actuator 110 according to the present invention. The second actuator 110 includes a housing 112, an actuation cup 114, a taper ring 118, an end cap 120 and a push rod 126. Instead of a unitary dog assembly, however, the second actuator 110 includes a plurality of individual dog arms 123 and dogs 124 extending from the dog arms 123. Thus, the dog arms 123 are not attached to a back plate. Moreover, the dog arms 123 are located in longitudinally-extending grooves 115 in the actuation cup 114 (see FIG. 4). The dog arms 123 may slide along the grooves 115. For example, an actuation cup having four grooves 115 spaced ninety degrees apart may accommodate four dog arms 123. The grooves 115 may be machined into the actuation cup 114.

One end of a spring 132 is secured to the actuation cup 114. A washer 125 is secured to an opposite end of the spring 132.

With the actuation cup 114 at the top position and the plunger withdrawn from the housing 112, the spring 132 biases the washer 125 against the dogs 124. In turn, the dogs 124 are forced to the bottom of the taper ring ramp. The dog arms 123 are still partially supported by the actuation cup 114.

When a plunger 134 is inserted into the housing 112 and the push rod 126 is depressed, the actuation cup 114 is forced over the dog arms 123. Consequently, the dogs 124 are forced up the taper ring ramp and into engagement with the groove in the plunger 134.

The second actuator 110 further includes an electromagnetically-actuated key 128 for locking the push rod 126 when the actuation cup 114 reaches the bottom position. An excitation supplied to the key 128 causes the key 128 to release the push rod 126 and allow the actuation cup 114 to move back to the top position. The spring 132 is sized to force the actuation cup 114 towards the top position.

Figure 5:
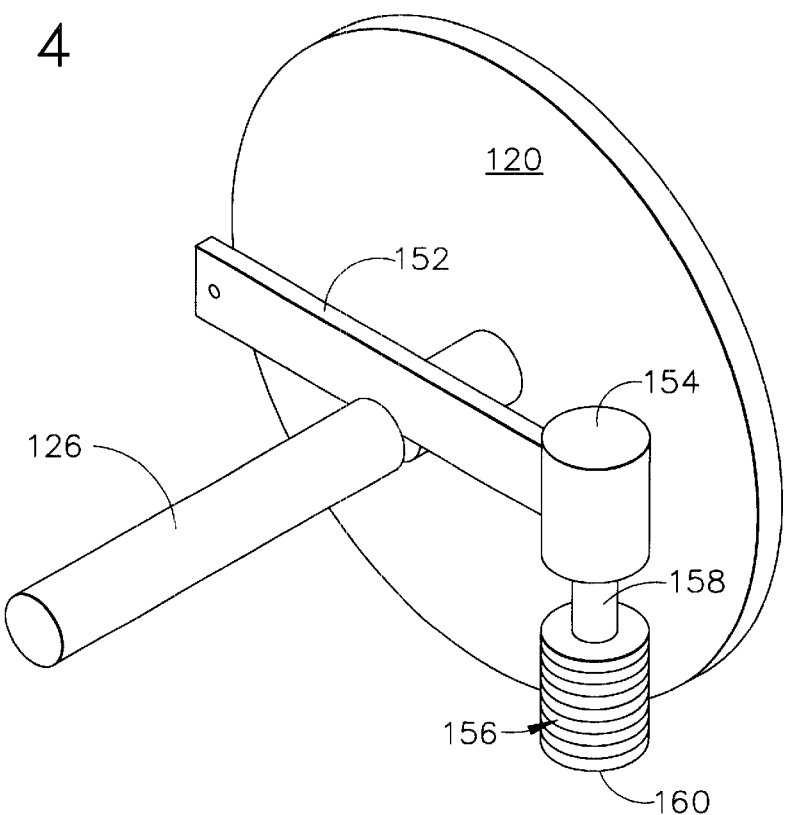
FIG. 5 is an illustration of an electromechanical key for the second actuator.

FIG. 5 shows the electromagnetically-actuated key 128 in greater detail. The electromagnetically-actuated key 128 includes a swing arm 152 and a permanent magnet 154 secured to one end of the swing arm 152. An opposite end of swing arm 152 is pivoted to the end cap 120. The swing arm 152 can pivot between a first position and a second position. In the first position, the swing arm 152 engages an annular groove in the push rod 126 to lock the push rod 126 in place. With the push rod 126 locked in place, the actuation cup 114 is held at the bottom position. In the second position, the swing arm 152 does not engage the push rod groove. Thus, the push rod 126 is free to move linearly.

An electromagnet 156 is also secured to the end cap 120. A North polarity of the permanent magnet 154 is proximate one end of the electromagnet 156 when the swing arm 152 is at the first position. The permanent magnet 154 is magnetically attracted to an iron core 158 of the electromagnet 156.

When a coil 160 of the electromagnet 156 is pulsed, a North polarity is generated. The North polarity of the electromagnet 156 repels -S. the North polarity of the permanent magnet 154 and thereby causes the swing arm 152 to pivot to the second position and disengage the push rod groove. A stop (not shown) may be secured to the end cap 120 to stop the motion of the swing arm 152 at the second position. Once the swing arm 152 has disengaged the push rod groove, the actuation cup 114 is forced towards the top position. As the actuation cup 114 is moved towards the top position, the dogs 124 begin to move outward. Once the dogs 124 have disengaged the plunger groove, the plunger 134 is free to be removed from the housing 112.

When the excitation is discontinued, the permanent magnet 154 is once again magnetically attracted to the iron core 158 of the electromagnet 156. This magnetic attraction causes the swing arm 152 to be forced against the push rod 126. The second actuator 110 is reset simply by depressing the push rod 126. When the annular groove in the push rod 126 crosses the swing arm 152, the swing arm 152 re-engages the annular groove (with help from the magnetic attraction of the permanent magnet 154 to the core 158) and once again locks the push rod 126 in place. Thus disclosed are NEA actuators 10 and 110 that are capable of instantaneous operation. The NEA actuators 10 and 110 produce low levels of functional shock during release, and they do not produce contaminants. The actuators 10 and 110 are reusable, which allows for repeated testing. Moreover, the actuators 10 and 110 can be reused without disassembly.

The actuators 10 and 110 are not limited to any particular application. Applications for the actuators include aerospace applications, automotive applications and any other applications where a soft release is desired.

The actuators 10 and 110 are not limited to the keys described above. Nor are the actuators 10 and 110 limited to four dogs. Any number of dogs may be used.

Certain features of the first actuator 10 may be used on the second actuator 110, and vice versa. For example, the metal memory key may be used in the second actuator, and the electromagnetically-actuated key may be used in the first actuator.

The invention is not limited to the specific embodiments described above. Instead, the invention is construed according to the claims that follow.

What is claimed is:

1. A non-explosive actuator comprising:
    a housing;
    an actuation cup within the housing, the actuation cup being movable between a first position and a second position within the housing;
    at least one dog within the housing, the actuation cup biasing the dog inwards with respect to the housing when the actuation cup is in the first position, the actuation cup allowing the dog to move outwards with respect to the housing when the actuation cup is moved towards the second position;
    a spring between the actuation cup and the at least one dog; and
    a taper ring having a ramped surface, the spring biasing the at least one dog against the ramped surface when the actuation cup is in the second position.

2. The actuator of claim 1, wherein the ramped surface has an angle between 10 and 15 degrees.

3. The actuator of claim 1, further comprising a plunger having a tapered groove, the tapered groove being engaged by at least one dog when the plunger is inserted in the housing and the actuation cup is in the first position.

4. A non-explosive actuator comprising:
    a housing;
    an actuation cup within the housing, the actuation cup being movable between a first position and a second position within the housing;
    at least one dog within the housing, the actuation cup biasing the dog inwards with respect to the housing when the actuation cup is in the first position, the actuation cup allowing the dog to move outwards with respect to the housing when the actuation cup is moved towards the second position; and
    a spring having one end secured to the actuation cup, the spring being between the actuation cup and a plunger when the plunger is inserted into the housing.

5. The actuator of claim 4, further comprising a taper ring having a ramped surface; and a second spring biasing the at least one dog against the ramped surface when the actuation cup is in the second position.

6. A non-explosive actuator comprising:
    a housing;
    an actuation cup within the housing, the actuation cup being movable between a first position and a second position within the housing; and
    a plurality of dogs within the housing, the plurality of dogs respectively located in grooves in the actuation cup; the actuation cup biasing the dogs inwards with respect to the housing when the actuation cup is in the first position, the actuation cup allowing the dogs to move outwards with respect to the housing when the actuation cup is moved towards the second position.

7. The actuator of claim 1, further comprising a base plate and a plurality of arms extending from the base plate, the at least one dog comprising dogs the dogs extending from the arms.

8. The actuator of claim 1, further comprising a push rod extending into the housing; and a key for locking the push rod in place, the actuation cup being in the first position when the push rod is locked in place.

9. The actuator of claim 8, wherein the key is made of a memory metal.

10. The actuator of claim 8, wherein the key includes a permanent magnet and a swing arm having a first end pivotally attached to a portion of the housing, the permanent magnet being secured to a second end of the swing arm, the swing arm being pivotable between a first position and a second position, the swing arm engaging the push rod when the swing arm is in the first position, the swing arm not engaging the push rod when the swing arm is in the second position; the actuator further comprising an electromagnet having one end proximate the permanent magnet when the swing arm is in the first position.

11. A non-explosive actuator comprising:
    a housing having first and second ends;
    an actuation cup movable within the housing, the actuation cup being movable between a first position and a second position; and
    a plurality of dogs within the housing, the actuation cup forcing the dogs to a bias position when the actuation cup is at the first position, the dogs being movable outwards and away from the bias position when the actuation cup is moved towards the second position;
    a taper ring at the second end of the housing; and
    means for biasing the actuation cup towards the second position and biasing the dogs against the taper ring when the actuation cup is moved towards the second position.

12. The actuator of claim 11, wherein the taper ring has a surface that is ramped at an angle between 10 and 15 degrees, the dogs being moved down the ramp when the actuation cup is moved towards the second position, the dogs being moved up the ramp and towards the bias position when the actuation cup is moved towards the first position.

13. The actuator of claim 11, further comprising a plunger having a tapered groove, the tapered groove being engaged by each dog when the plunger is inserted in the housing and the dogs are at the bias position.

14. The actuator of claim 11, wherein the actuation cup includes a plurality of grooves, each dog being located within a corresponding groove.

15. The actuator of claim 11, further comprising a base plate and a plurality of arms extending from the base plate, the dogs extending from the arms.

16. The actuator of claim 11, further comprising a push rod for pushing the actuation cup towards the second position, the push rod extending into the housing through the first end; and a key for locking the push rod in place, the actuation cup being in the second position when the push rod is locked in place.

17. A non-explosive actuator comprising:
   a push rod having a groove;
   a permanent magnet;
   a swing arm having a first end, the first end being movable between first and second positions, the permanent magnet being secured to the first end of the swing arm, the swing arm engaging the groove when the swing arm is in the first position, the swing arm not engaging the groove when the swing arm is in the second position; and
   an electromagnet having one end proximate the permanent magnet when the swing arm is in the first position.

18. The actuator of claim 17, wherein the electromagnet includes a core and a coil wrapped around the core, the permanent magnet being attracted to the core when the swing is in the second position.

19. The actuator of claim 1, wherein the at least one dog is a plurality of dogs, the dogs located in grooves in the actuation cup.

20. The actuator of claim 4, further comprising a push rod extending into the housing; and a key for locking the push rod in place, the actuation cup being in the first position when the push rod is locked in place.

21. The actuator of claim 9, wherein the at least one dog is a plurality of dogs, the dogs located in grooves in the actuation cup.

22. The actuator of claim 9, further comprising a base plate and a plurality of arms extending from the base plate, the at least one dog comprising dogs, the dogs extending from the arms.

23. The actuator of claim 6, further comprising a push rod extending into the housing; and a key for locking the push rod in place, the actuation cup being in the first position when the push rod is locked in place.

* * * * *